United States Patent
Nielsen et al.

(10) Patent No.: US 12,079,614 B2
(45) Date of Patent: Sep. 3, 2024

(54) UPDATING SOFTWARE AND/OR FIRMWARE OF PLURAL WIND TURBINE DEVICES

(71) Applicant: Siemens Gamesa Renewable Energy A/S, Brande (DK)

(72) Inventors: Rasmus Nielsen, Herning (DK); Soeren Riis, Vejle (DK); Lennart Weiss, Middelfart (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 131 days.

(21) Appl. No.: 17/626,845

(22) PCT Filed: Jun. 25, 2020

(86) PCT No.: PCT/EP2020/067841
§ 371 (c)(1),
(2) Date: Jan. 13, 2022

(87) PCT Pub. No.: WO2021/013467
PCT Pub. Date: Jan. 28, 2021

(65) Prior Publication Data
US 2022/0291917 A1    Sep. 15, 2022

(30) Foreign Application Priority Data
Jul. 23, 2019 (EP) .................................... 19187821

(51) Int. Cl.
*G06F 8/65* (2018.01)
*G06F 8/61* (2018.01)
*H04L 45/02* (2022.01)

(52) U.S. Cl.
CPC ................. *G06F 8/65* (2013.01); *G06F 8/61* (2013.01); *H04L 45/02* (2013.01)

(58) Field of Classification Search
CPC ... G06F 8/65; G06F 8/61; G06F 8/656; H04L 45/02; F05B 2230/80; G05B 19/0426; Y02P 70/50; F03D 7/047
See application file for complete search history.

(56) References Cited

U.S. PATENT DOCUMENTS

| | | | | |
|---|---|---|---|---|
| 7,853,609 B2 * | 12/2010 | Dehghan | ................. | H04L 67/34 707/778 |
| 8,543,996 B2 * | 9/2013 | Langen | ..................... | G06F 8/65 717/173 |

(Continued)

FOREIGN PATENT DOCUMENTS

| | | |
|---|---|---|
| EP | 1575244 A2 | 9/2005 |
| FR | 3067148 A1 | 12/2018 |
| WO | 2018130071 A1 | 7/2018 |

OTHER PUBLICATIONS

PCT International Search Report and Written Opinion of International Searching Authority mailed Feb. 2, 2018 corresponding to PCT International Application No. PCT/EP2020/067841 filed Jun. 25, 2020.

*Primary Examiner* — Matthew J Brophy
(74) *Attorney, Agent, or Firm* — Schmeiser, Olsen & Watts LLP

(57) ABSTRACT

Provided is a method of updating software and/or firmware of plural devices of a wind turbine, the plural devices being connected in a communication network to a main computing device, the method including: obtaining information regarding a topology of the communication network at the main computing device; obtaining update packages at the main computing device; triggering, by the main computing device, updating all devices for which an update package is present in a topology derived order, in particular staring at a periphery and continuing inwards.

15 Claims, 1 Drawing Sheet

(56) References Cited

U.S. PATENT DOCUMENTS

| | | | |
|---|---|---|---|
| 8,799,419 B1* | 8/2014 | Lin | G06F 9/45558 |
| | | | 709/221 |
| 8,799,422 B1* | 8/2014 | Qu | H04L 49/70 |
| | | | 709/221 |
| 10,216,514 B2* | 2/2019 | Wilkinson | H04L 41/0866 |
| 11,340,889 B2* | 5/2022 | Voltz | G06F 8/654 |
| 11,403,087 B2* | 8/2022 | Lin | H04L 67/34 |
| 2003/0023963 A1* | 1/2003 | Birkholz | G06F 8/65 |
| | | | 717/172 |
| 2005/0203968 A1* | 9/2005 | Dehghan | G06F 8/65 |
| | | | 707/999.203 |
| 2007/0118626 A1* | 5/2007 | Langen | G06F 8/65 |
| | | | 709/221 |
| 2008/0086652 A1* | 4/2008 | Krieger | G06F 8/65 |
| | | | 713/330 |
| 2011/0138377 A1* | 6/2011 | Allen | G01D 4/004 |
| | | | 717/173 |
| 2011/0145811 A1* | 6/2011 | Middendorf | F03D 7/047 |
| | | | 700/287 |
| 2012/0102481 A1* | 4/2012 | Mani | G06F 8/65 |
| | | | 717/172 |
| 2015/0160937 A1* | 6/2015 | Johnsen | G06F 21/575 |
| | | | 717/171 |
| 2017/0076235 A1* | 3/2017 | Noto | G06F 9/4843 |
| 2017/0089325 A1* | 3/2017 | Timbus | G05B 23/0283 |
| 2017/0102933 A1* | 4/2017 | Vora | G06F 8/65 |
| 2017/0286099 A1* | 10/2017 | Wilkinson | G06F 8/65 |
| 2019/0182107 A1* | 6/2019 | Saxena | H04L 41/122 |
| 2020/0159518 A1 | 5/2020 | Gillaux | |
| 2020/0278858 A1* | 9/2020 | Voltz | G06F 9/4401 |
| 2023/0152652 A1* | 5/2023 | Trikha | H10K 59/65 |
| | | | 700/276 |

* cited by examiner

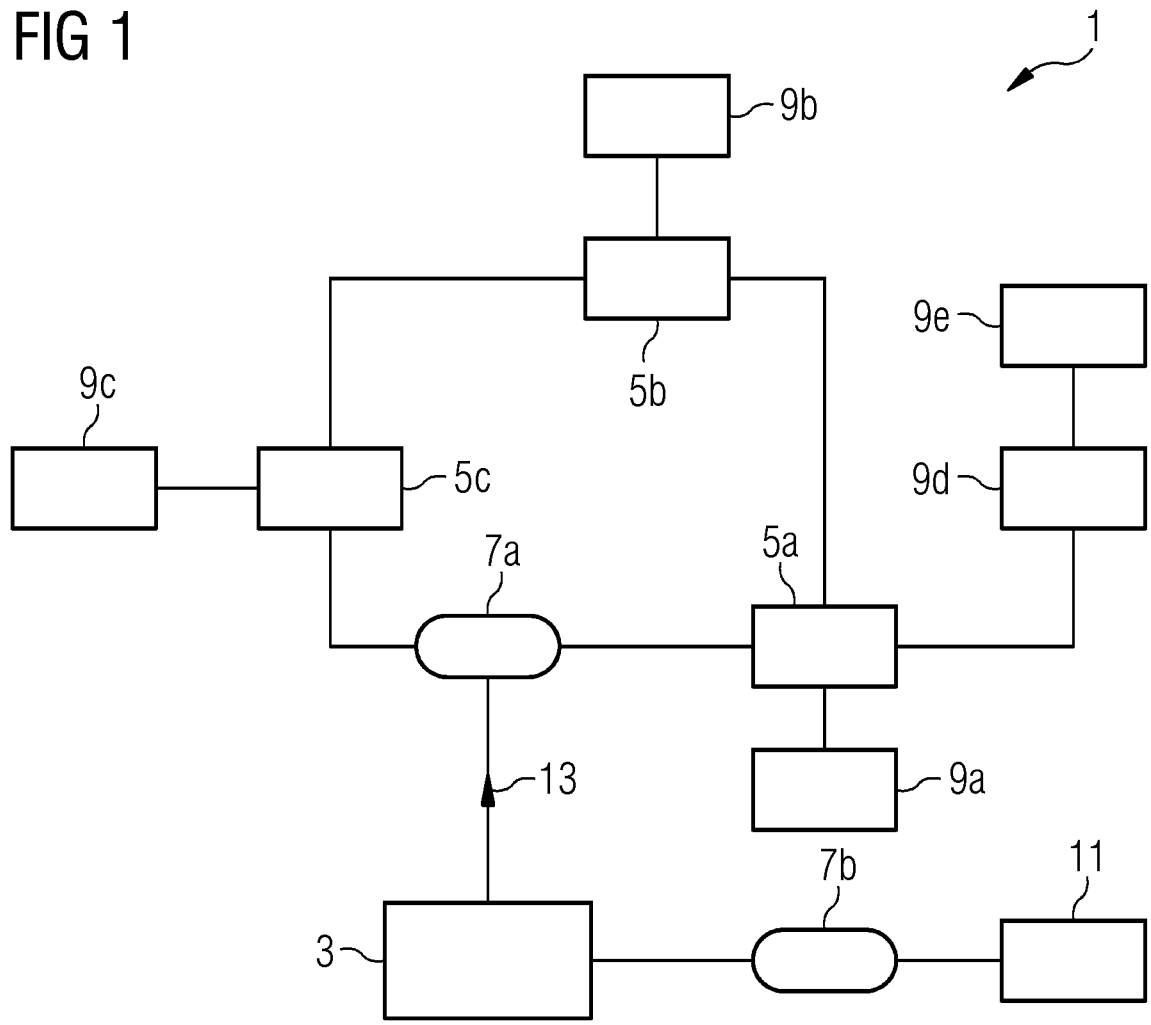
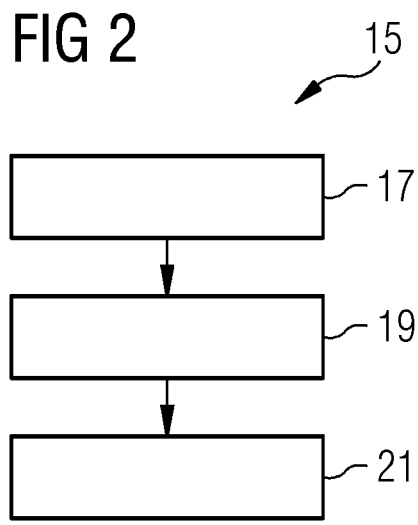

UPDATING SOFTWARE AND/OR FIRMWARE OF PLURAL WIND TURBINE DEVICES

CROSS-REFERENCE TO RELATED APPLICATIONS

This application claims priority to PCT Application No. PCT/EP2020/067841, having a filing date of Jun. 25, 2020, which is based off of EP Application No. 19187821.4, having a filing date of Jul. 23, 2019, the entire contents both of which are hereby incorporated by reference.

FIELD OF TECHNOLOGY

The following relates to a method of updating software and/or firmware of plural devices of a wind turbine, relates further to a computing device which is adapted to control or carry out the method and further relates to a wind turbine comprising the computing device.

BACKGROUND

A wind turbine may comprise plural devices which run firmware and/or software for operation. As the software and/or firmware is developed further, the devices need to be updated from time to time. A control system of a wind turbine may for example comprise a main computer and a range of peripheral devices, such as I/O stations, I/O modules, hub controller, converter controller and switches, which are all linked through a network (wireless or cable-based) and may be partly based on a ring network for redundancy purposes. Sometimes the main computer and peripheral devices need to be upgraded or updated with new software or firmware. Since this process causes the turbine to be stopped, and thus not producing any power, it is essential to keep the upgrade time or update time as short as possible.

Conventionally, the idle time of the wind turbine was long due to the long-lasting update process.

Thus, there may be a need for an update method and a computing device enabling updating of plural wind turbine devices, wherein the idle time of the wind turbine can be reduced and the update of the software and/or firmware may be performed in a reliable and fast manner.

SUMMARY

According to an embodiment of the present invention it is provided a method of updating software and/or firmware of plural devices of a wind turbine, the plural devices being connected in a communication network to a main computing device, the method comprising: obtaining information regarding a topology of the communication network at the main computing device; obtaining update packages at the main computing device; triggering, by the main computing device, updating all devices for which an update package is present in a topology derived order, in particular staring at a periphery and continuing inwards.

The method may partly be performed by the main computing device and partly also be performed by the devices which need updating. The software may comprise control software and/or measurement software and/or processing software. The firmware may relate to control of input output modules, measurement sensors, controllers, etc. The devices may comprise input/output modules, input/output stations, switches, breakers, a converter and so on.

The communication network communicatively connects each of the devices (via none, one or more other devices) to the main computing device. The topology of the communication network may describe the structure of the communication network and the (relative) arrangement of the different devices within the communication network, in particular in relation to the main computing device. Some devices may be directly connected to the main computing device, some other devices may be indirectly connected to the main computing device, via one or more still other devices. The more devices are in between a considered device and the main computing unit, the farer outwards the considered device is arranged in the topology or regarding the topology. In particular, a distance between a considered device and the main computing device may be envisioned to reflect (or correspond to) the length of a chain connecting the considered device and the main computing device, the chain comprising none, one or more other devices between the considered device and the main computing device. The longer the chain, the farer away the considered device is from the main computing device. The communication network may be Ethernet-based, Bluetooth-based or using other communication technology. The topology may partly be ring type, star type or a hybrid thereof.

The update packages may be obtained from an external server via another communication network, such as the Internet or other. The update packages may first be analyzed regarding to which of the plural devices they belong, or they are directed to. Furthermore, it may be determined which of the plural devices need an upgrade based on analysis of the installed versions of the respective software and/or firmware and comparing the version with the version of the update packages.

The update process may be an ordered process wherein first, an order of triggering updating or updating the devices may be determined before actually starting triggering updating or updating. Triggering updating (or updating) may start at a periphery of the communication network as derived by the topology information in that devices farthest outward from the main computing device are triggered for updating first followed by devices arranged closer and closer to the main computing device. Continuing the triggering updating inwards may mean to go from the periphery closer and closer towards the main computing device for updating the respective devices. When the order in which updating is triggered is derived from the topology, the complete updating process may be accelerated compared to conventional methods.

In one embodiment the firmware upgrades may be sent to all devices not in an order derived from the topology. Only the restart/reboot procedure may be done "intelligently", i.e., in an order derived from the topology, since restarts/resets may be what could break the communication link.

According to an embodiment of the present invention, triggering updating the devices in the topology derived order comprises: triggering updating a device for which any other device located farther outwards from the main computing device in the topology have previously been triggered for updating, wherein triggering updating is in particular performed in a loop until all devices for which an updated package is present are triggered for updating.

When any other device located farther outwards from the main computing device than the considered device has previously already been triggered for updating (or updated), the updating of the other device may not be disturbed by updating the device which is in the topology located closer to the main computing device. Thus, it may be avoided that updating a particular device interferes with (or delays or even prohibits) updating another device. Thereby, the update process may be accelerated. The loop may for example be implemented in software, for example in a recursive manner. Implementing the loop may enable to finally update all devices which need updates.

According to an embodiment of the present invention, triggering updating a device comprises: restarting the device having the update package installed. According to one embodiment, triggering updating only comprises restarting the device having the update package installed. If the update package is only installed but the device has not been restarted yet, the device is not considered to be updated yet. The update may only be completed, if the update package has been installed and the device has been restarted. In this embodiment, therefore, the restarting all the devices which have already the update package installed may be performed in an ordered manner, in particular in a topology derived order, as described above. In other embodiments, however, also the supply and/or the installation of the update packages may be performed in an ordered manner, in particular in a topology derived ordered manner.

According to an embodiment of the present invention, triggering updating a device comprises: installing the update package, in particular from the main computing device storage or a device storage, at the device. In this embodiment, also the installing the updated package may be conducted in a topology derived order. Furthermore, the restarting may also be performed in a topology derived order.

In still other embodiments of the present invention, also the supply of the respective update package to a considered device or the supply of all update packages to the plural devices may be performed in a topology derived order.

In other embodiments, the supply may partly be performed in parallel and partly may be performed in sequence. For example, a particular first group of devices may be supplied with the respective software packages in parallel and another group of devices may be supplied in parallel with the update packages subsequent to the supply to the first group of devices.

According to an embodiment of the present invention, the device is triggered for updating, while the other device located farther outwards from the main computing device in the topology which has previously been triggered for updating is still installing the update package and/or is still restarting (i.e. restarting not completed).

When the other devices located farther outwards from the main computing device in the topology which has previously been triggered for updating is still installing the update package and/or is still restarting, the updating may still be accelerated, since the triggering for updating the device (closer to the main computing device than the other device) will not interfere with the updating the other device, since the other device may have already received the update package and may have stored it locally. Thus, a communication link to the main computing device may not be necessary any more for the other device located farther outwards from the main computing device than the device which is triggered for updating.

According to an embodiment of the present invention, the method further comprises after obtaining the update packages at the main computing device and in particular before triggering updating a device: supplying, from the main computing device, the respective update packages to at least those devices which require or enable to locally store an update package for enabling updating with the update package. Supplying the respective update packages from the main computing device to those devices which require or enable to locally store an update package may also be performed in a topology derived order or may be derived randomly or based on update package size.

When the supplying the respective update packages is supplied in a topology derived order, first, the devices located at the periphery of the topology and then the devices located closer and closer to the main computing devices may be sequentially supplied with the respective update package. Then, when the peripheral devices have already been supplied with the update package, those may be triggered for restarting, while other devices closer to the main computing device are still being supplied with the respective update packages. In particular, performing the supplying the respective update packages in an ordered manner or in an arbitrary manner may still depend on the volume of data contained in the update packages. When the update packages are relatively large in data size, the supplying the update packages may be performed in a topology derived order. When the update packages are relatively small in size, the supplying may be performed in parallel to all devices or partly in parallel and partly sequentially.

According to an embodiment of the present invention, the topology indicates for each device a chain of none, one or more other devices, the number of devices defining a length of the chain, a sequential arrangement of devices defining a device sequence in the chain, via which the main computing device is connected to this device, wherein supplying the respective update packages and/or triggering updating is performed in an order derived from lengths of chains and/or device sequences in the chains.

A considered device may be connected to the main computing device via more than one chain. In this case, the chain having the smallest length may be utilized for defining the update order. Supplying the respective update packages and/or installing the update packages and/or restarting the device having the update package installed may or may not be performed in an order derived from length of chains and/or device sequences in the chains. Thereby, the update process may further be simplified and accelerated.

According to an embodiment of the present invention, supplying the respective update package and/or triggering updating is started at a device arranged at a respective end of a longest chain, wherein this device is in particular restarted as soon as this device has received or has installed the update package. The process may then continue to the device adjacent to the device at a respective end of the longest chain, wherein the adjacent device is closer to the main computing device. The process may continue with the next adjacent device adjacent to the adjacent device and may continue in this manner until the device at the beginning of the chain, i.e. the device directly connected to the main computing unit has been triggered for updating or has installing the update package or has already been restarted with the update package installed.

According to an embodiment of the present invention, supplying the respective update packages and/or triggering updating is performed starting at a device arranged at a respective end of a chain and is sequentially performed for all devices in an order towards a device arranged at a beginning of the chain. Thereby, the method may be implemented in a simple manner, in particular using a recursive loop.

According to an embodiment of the present invention, the method is performed such that before restarting a device using the installed update package all devices farther outwards in the topology have at least received or have been installed the respective update package or even have started restarting or completed restarting.

When the device arranged at a particular location within the topology is restarted not earlier than all devices farther outwards in the topology have started restarting or completed restarting or have at least received the update package or even have installed the respective update package, the restarting of the considered device may not interfere or prohibit or disturb the updating of the devices farther outwards in the topology.

According to an embodiment of the present invention, the method further comprises if the update packages comprise a main computing device update package: updating the main computing device before triggering updating any of the other devices and in particular before supplying any other update package to any other device.

The main computing device may control the update process. Thus, it is reasonable to first update the main computing device before updating any other devices. Particular devices, such as the converter, may however been updated in parallel with the main computing device. In particular, the plural devices of the wind turbine may be grouped in at least two groups of devices. The first group of devices may be updated according to the update method in a topology derived order. At least one other group may be updated in a different order, for example also in parallel with the main computing device or sequentially. Thereby, the method may accommodate high flexibility.

According to an embodiment of the present invention, triggering updating any device which is connected to any other device in the chain farther away from the main computing device and for which there is an update package but that has not yet been triggered for update is avoided. Thereby, interference with an update of a device farther outwards may be avoided.

According to an embodiment of the present invention, the topology information is obtained from configuration data or is calculated by asking all devices about their connectedness.

Asking all the devices about their connectedness or deriving the network topology may be done by the main computing device.

The topology may for example be defined or described as a graph structure or tree structure.

It should be understood that features, individually or in any combination, disclosed, described, explained or applied to an update method of software and/or firmware of plural devices may, individually or in any combination, also applied to a computing device according to an embodiment of the present invention and vice versa.

According to an embodiment of the present invention it is provided a computing device adapted to control or carry out an update method according to one of the embodiments as described above.

Furthermore, it is provided, according to an embodiment of the present invention, a wind turbine having a computing device according to the preceding embodiment and having plural devices being connected in a communication network to the computing device.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a communication network including a main computing device according to an embodiment of the present invention as comprised in a wind turbine; and FIG. 2 schematically illustrates a scheme of a method of updating software and/or firmware of plural devices of a wind turbine according to an embodiment of the present invention.

DETAILED DESCRIPTION

The communication network 1 of a wind turbine schematically illustrated in FIG. 1 comprises a main computing device 3 which is adapted to control or carry out a method of updating software and/or firmware of plural devices of a wind turbine according to an embodiment of the present invention. The update method is described below with reference to FIG. 2.

The communication network 1 connects plural devices of a wind turbine to the main computing device 3. In particular, in the communication network 1, plural I/O stations or interface stations 5a, 5b, 5c are connected. Furthermore, plural switches 7a, 7b are connected within the communication network 1. Thereby, the switches 7a, 7b are directly connected to the main computing device, i.e., there is no other device in between the respective switch 7a, 7b and the main computing device 3. In contrast, the I/O stations 5a and 5c are only connected to the main computing device 3 via the switch 7a. Thus, for example the I/O station 5c is connected to the main computing device in a chain comprising the I/O station 5c and the switch 7a. The I/O station 5a is connected to the main computing device 3 via a chain of devices comprising the I/O station 5a and the switch 7a.

The communication network 1 further comprises plural I/O modules 9a, 9b, 9c, 9d, 9e which are still further outwards (from the main computing device 3) in the topology of the communication network 1. In particular, the I/O module 9c is connected to the main computing device 3 in a chain comprising the I/O module 9c, the I/O station 5c and the switch 7a. The I/O module 9b is connected to the main computing device 3 in a chain comprising the I/O module 9b, the I/O station 5b, the I/O station 5c and the switch 7a. A converter 11 is connected to the main computing device via a switch 7b.

Although not illustrated in FIG. 1, it should be clear that in other embodiments of the present invention there may be multi modules connected to any of the I/O stations 5a, 5b, 5c, 5 (or any other device). The chain is not restricted to one module per I/O station. Further, there may be more I/O stations and/or I/O modules than illustrated.

For example, the I/O station 5a is triggered for updating only if the other devices farther outwards, namely the I/O module 9e and I/O module 9d have previously been triggered for updating, in particular after the I/O module 9e and the I/O module 9d have at least received the respective update package if they support locally storing update packages.

If these devices, the I/O modules 9e, 9d do not allow to locally store update packages, the software packages 13 may be supplied from the main computer, while the respective update packages are installed at the I/O modules 9e, 9d. At least after the respective update packages 13 have been installed at the devices located farther outwards from the computing device, i.e., the I/O modules 9e, 9d, the I/O station 5a may be triggered for updating, in particular be restarted, but not earlier. Thereby, communication links to the I/O modules 9e, 9d utilized for supplying the respective software updates may not be interrupted or disturbed.

Further, the I/O station 5a may be triggered for updating while for example the I/O module 9d located farther outwards from the main computing device 3 has previously been triggered for updating is still installing the update package and/or is still restarting.

The update packages 13 may comprise update packages for some or all devices. The respective update packages may be directed to the associated devices by appropriately addressing the respective software packages by the main computing device 3.

According to an embodiment of the present invention, the topology indicates for each device, for example the device 9e a chain, here the chain comprising the devices 9e, 9d, 5a, 7a. In general, a chain may comprise none, one or more other devices. The number of devices (for the device 9e for devices) may define a length of the chain and a sequential arrangement of the devices, for example the sequence of devices in the order 9e, 9d, 5a, 7a defines a sequential arrangement of devices defining a device sequence in the chain. The supplying the respective update packages 13 and/or the triggering updating may be performed in an order derived from the length of chains and/or device sequences in the chains.

As soon as the I/O module 9e has received the associated software update package 13, the device 9e may be restarted having the update package installed. The end of the chain is here the I/O module 9e and the triggering the update or the update is started at this device 9e. Subsequently, the I/O module 9d is triggered for update, subsequently the I/O station 5a is triggered for update and still subsequently the switch 7a is triggered for update thereby completing the update process for this chain of devices.

By determining the exact position of each device in the communication network 1 it is possible to build an exact topology or topology map of the setup as seen from the main computing device 3. Using the topology map or topology it is possible to derive an update order for updating the devices 5a, 5b, 5c, 7a, 7b, 9a, 9b, 9c, 9d, 9e and the converter 11. According to an embodiment of the present invention, the update process may be performed as follows:

1) The network topology is calculated or obtained, in particular it is calculated how the network topology is seen from the main computing device 3. This may be possible, because the main computing device may be in knowledge to which other device(s) a particular device is connected to. Further, the network topology may be obtained from a configuration file.
2) In a next step, the new software package(s) may be applied, which may also include software/firmware for the peripheral devices, to the main computing device 3. The main computing device 3 may be updated and restarted.
3) The new software/firmware packages may be pushed (in particular supplied and/or locally stored) to all peripheral devices. However, the new software/firmware is not applied (in particular is not installed and/or the updated device is not restarted). Depending on the bandwidth upload of the new software/firmware may be performed in parallel or partly sequentially.
4) When the outermost device in a chain has received the new software/firmware, this firmware is applied (e.g., installed at the device and the device may be restarted) to the outermost device first. This may cause the respective device to go offline (at least during restarting the device).
5) When the outermost device has been updated (e.g., including restarting, wherein the installed update package has been utilized for restarting the device), it is continued with the device one level closer to the main computing device 3 and the software/firmware is applied also to the closer device. Then, the method step (4) is repeated, if it is ready for it.

Applying the software/firmware may start for each peripheral device as soon as the outermost device is ready for it and it does not break a communication link to devices that have not completed its upgrade or update. This may ensure that no communication link is broken during uploading the firmware/software to a device and that installation can start as early as possible.

FIG. 2 schematically illustrates a method 15 of updating software and/or firmware of plural devices of a wind turbine according to an embodiment of the present invention.

In a method step 17, information regarding a topology of the communication network (for example network 1 illustrated in FIG. 1) is received at a main computing device (for example at the main computing device 3 illustrated in FIG. 1). At a method step 19, update packages are obtained at the main computing device, for example main computing device 3 illustrated in FIG. 1. At a method step 21, updating is triggered at all devices for which an update package is present in a topology derived order, i.e., from the relative connection arrangement of the devices with respect to the connection to the main computing device 3. The method 15 may comprise further optional method steps as have been described above.

Embodiments of the present invention may provide the following advantages or features:
1) The performance may be improved enabling to do much of the update process in parallel
2) The downtime of the turbine or idle time of the turbine may be reduced. For example, if all wind turbine device have to be upgraded, the upgrade or update time may be reduced from 70 minutes to about 30 minutes. A benefit may be that the wind turbine may be made operational faster than conventionally known, causing less downtime due to software upgrades.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of updating software and/or firmware of plural devices of a wind turbine, the plural devices being connected in a communication network to a main computing device, the method comprising:
obtaining information regarding a topology of the communication network at the main computing device;
obtaining update packages at the main computing device;

supplying respective update packages to respective devices at least partially in a topology derived order and/or installing respective update packages at respective devices at least partially in the topology derived order;

triggering, by the main computing device, updating all devices for which an update package is present in the topology derived order, wherein the topology indicates for each device of the plural devices a chain of none, one or more other devices, the number of devices defining a length of the chain, a sequential arrangement of devices defining a device sequence in the chain, via which the main computing device is connected to this device, such that supplying the respective update packages and/or installing the respective update packages are performed in an order derived from lengths of chains and/or device sequences in the chains and triggering updating is performed in the order derived from lengths of chains and/or device sequences in the chains.

2. The method according to claim 1, wherein triggering updating the devices in the topology derived order comprises:

triggering updating a device for which any other device located farther outwards from the main computing device in the topology have previously been triggered for updating.

3. The method according to claim 1, wherein triggering updating a device comprises:

restarting the device having the update package installed.

4. The method according to claim 1, wherein triggering updating a device comprises:

installing the respective update package.

5. The method according to claim 1, wherein the device is triggered for updating, while the other device located farther outwards from the main computing device in the topology which has previously been triggered for updating is still installing the update package and/or is still restarting.

6. The method according to claim 1, further comprising, after obtaining the update packages at the main computing device:

supplying, from the main computing device, the respective update packages to at least those devices which require or enable to locally store an update package for enabling updating with the update package.

7. The method according to claim 1, wherein updating all devices for which an update package is present in the topology derived order includes starting at a periphery of the topology and continuing inwards.

8. The method according to claim 1, wherein supplying the respective update package and/or triggering updating is started at a device arranged at a respective end of a longest chain.

9. The method according to claim 1, wherein supplying the respective update packages and/or triggering updating is performed starting at a device arranged at a respective end of a chain and is sequentially performed for all devices in an order towards a device arranged at a beginning of the chain.

10. The method according to claim 1, performed such that before restarting a device using the installed update package all devices farther outwards in the topology have at least received or have been installed the respective update package or even have started restarting or completed restarting.

11. The method according to claim 1, further comprising, if the update packages comprise a main computing device update package:

updating the main computing device before triggering updating any of the other devices.

12. The method according to claim 1, wherein triggering updating any device which is connected to any other device in the chain farther away from the main computing device and for which there is an update package but that has not yet been triggered for update is avoided.

13. The method according to claim 1, wherein the topology information is obtained from configuration data or is calculated by asking all devices about their connectedness.

14. A computing device adapted to control or carry out the method according to claim 1.

15. A wind turbine having the computing device according to claim 14, and having plural devices being connected in a communication network to the computing device.

* * * * *